United States Patent [19]

Miyazawa et al.

[11] Patent Number: 4,916,474

[45] Date of Patent: Apr. 10, 1990

[54] CAMERA HAVING A CPU RESET FUNCTION

[75] Inventors: Azuma Miyazawa, Mitaka; Atsushi Maruyama, Yokohama; Akira Inoue, Hachioji; Akira Watanabe, Hachioji; Akiteru Kimura, Hachioji, all of Japan

[73] Assignee: Olympus Optical Co., Ltd., Tokyo, Japan

[21] Appl. No.: 311,154

[22] Filed: Feb. 15, 1989

[30] Foreign Application Priority Data

Mar. 1, 1988 [JP] Japan ............................... 63-48219
Aug. 1, 1988 [JP] Japan .............................. 63-192553

[51] Int. Cl.[4] .......................... G03B 1/00; G03B 17/00
[52] U.S. Cl. ................................. 354/412; 354/484; 354/486; 354/173.1; 354/214
[58] Field of Search ............... 354/412, 202, 484, 485, 354/486, 288 P, 214, 173.1, 173.11

[56] References Cited

U.S. PATENT DOCUMENTS 4,103,307  7/1978  Shinoda et al. .
4,281,917  8/1981  Kitagawa et al. .

FOREIGN PATENT DOCUMENTS 54-145526  11/1979  Japan .

Primary Examiner—W. B. Perkey
Attorney, Agent, or Firm—Kenyon & Kenyon

[57] ABSTRACT

A camera having a CPU reset function. The CPU has an on state in which a reference clock is supplied to maintain the CPU in an oscillating state, and an off state in which the oscillation is stopped. When the on and off states are changed over by an external switch, a reset signal is generated to reset the CPU. Even if the CPU makes a runaway which cannot be noticed form the outside, the CPU is necessarily reset in response to the changeover operation of the external switch.

16 Claims, 13 Drawing Sheets

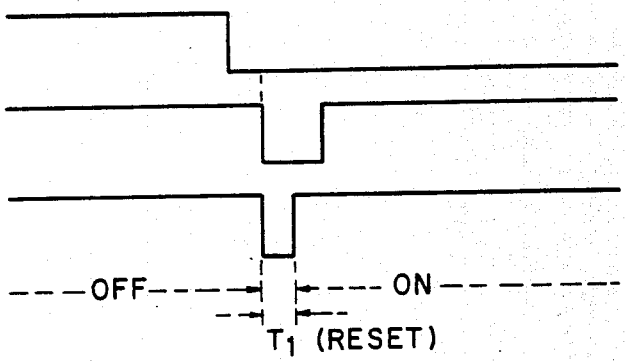
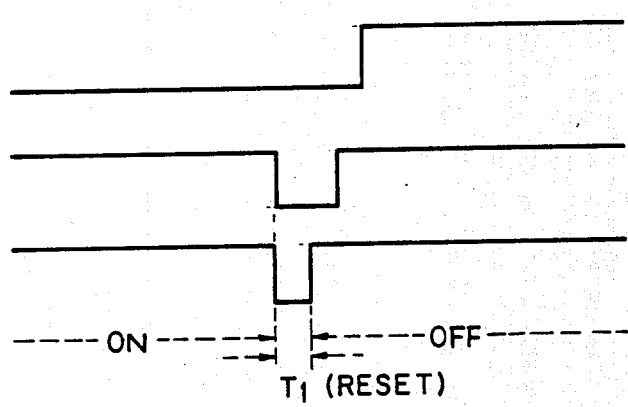
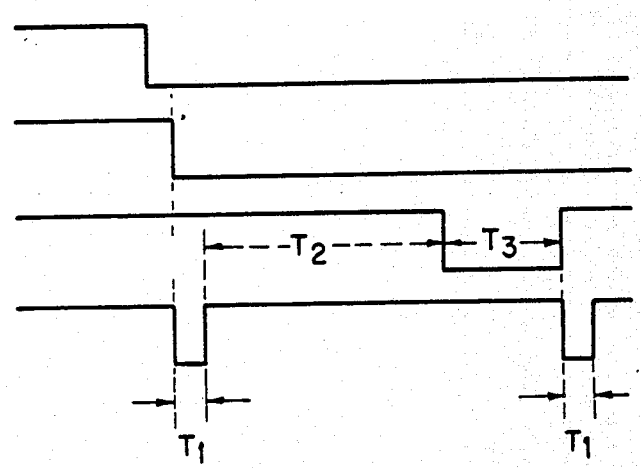

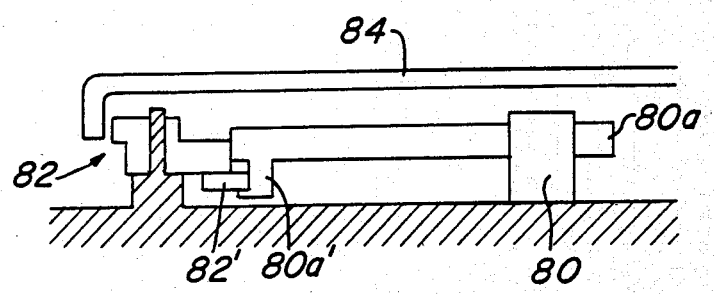
FIG. 17
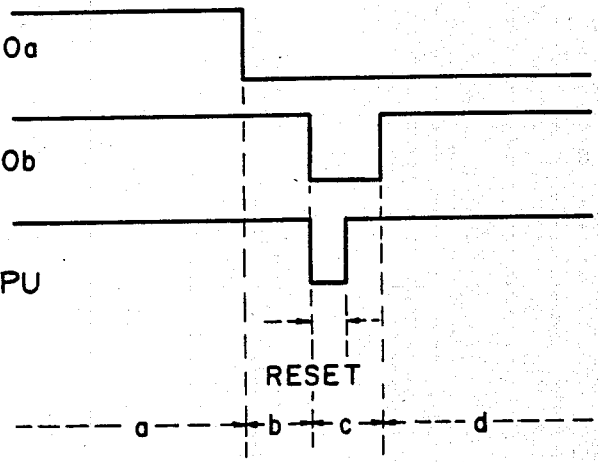
FIG. 18(a) PWSW 50a
FIG. 18(b) $\overline{RESET}$ 50b
FIG. 18(c) $\overline{RESET}$ CPU

CAMERA HAVING A CPU RESET FUNCTION

BACKGROUND OF THE INVENTION

1. Field of the Invention

This invention relates to a camera with a built-in CPU (central processing unit) for various control operations, and more particularly to a camera having a reset function for the CPU.

2. Description of the Related Art

In recent years, there have been cameras with built-in CPUs for controlling photographing operation in accordance with prewritten programs. In this type of camera, a photographing operation possible state and a photographing operation impossible state can be changed over by a switch such as a power switch provided in a camera body or a switch actuated in response to the opening and closing of a barrier of a photographing lens. When the switch is changed over to the photographing operation impossible state, it is impossible to photograph, and film is not wasted even if a release button is erroneously pushed. Moreover, in the photographing operation impossible state, the energy of a power source cell is not consumed.

Conventionally, the photographing operation impossible state has been established by the following methods:

[1] Electric power is completely shut off by turning off the above-mentioned switch; or

[2] Turning off the above-mentioned switch does not shut off power, but stops clock pulses to be applied to the CPU so that the CPU is in a standby state and a low consumed power mode is established.

The method [1] has an advantage that even if the CPU runs away and the camera operates erroneously, it is possible to recover the normal state by shutting off power and resetting the CPU (recovering the initial state of the CPU) when power is supplied again. However, since power is completely shut off from the CPU, camera operations such as film rewinding or automatic film advancing to the first effective frame cannot be effectuated at all.

In the above method [2], even if the CPU is in the standby state, if a signal from a film rewinding switch or a switch responsive to the opening and closing of a back cover of the camera body is inputted to an interrupt terminal of the CPU, then the CPU is changed over from the standby state to the normal operating state so that film rewinding and film advancing to the first effective frame can be made. However, if the CPU runs away, the power-on reset of the above method [1] cannot be used, and the only way to recover the normal state of the camera would be drawing out the cell from the camera body. Since camera bodies tend to be made of plastic recently, static electricity will enter a terminal of the CPU so that it is more likely than ever that the CPU runs away. Therefore there has been proposed a camera using the above method [2] and provided with a separate reset switch for the CPU. However, while the user will immediately notice such runaway of the CPU as causes a film winding and rewinding motor to run endlessly and he can turn on the reset switch, the user cannot notice any runaway of the CPU which is unnoticeable from the outside, as in the case that the program enters an endless loop, and he will not turn on the reset switch. Therefore, in the latter case, the abnormal state remains, and the energy of the power source cell is wasted. Thus, when the camera is used next time, it will not operate because of an insufficient voltage of the power source cell.

SUMMARY OF THE INVENTION

An object of the present invention is to provide a camera having a CPU reset function which utilizes the advantages of the above method [2] and in which the CPU can be restored to its normal state even if the CPU runs away and the user does not notice it.

According to the present invention, the CPU is reset in response to the actuation of an external switch for changing over between an exposure operation possible state and an exposure operation impossible state. Thus, even if the user does not notice a runaway of the CPU, the energy of a power source will not be wasted because the CPU is reset in response to the actuation of the external switch.

BRIEF DESCRIPTION OF THE DRAWINGS

FIGS. 9a–9c, 10a–10c and 11a–11d are signal wave form diagrams showing the operation of the operating switch shown in FIG. 7;

FIG. 17 is a cross-sectional view of the operating switch shown in FIGS. 16(a) to (d); and FIGS. 18a–18c are signal wave form diagrams showing the operation of the operating switch shown in FIGS. 16(a) to (d).

DETAILED DESCRIPTION OF PREFERRED EMBODIMENTS

Figure 1:
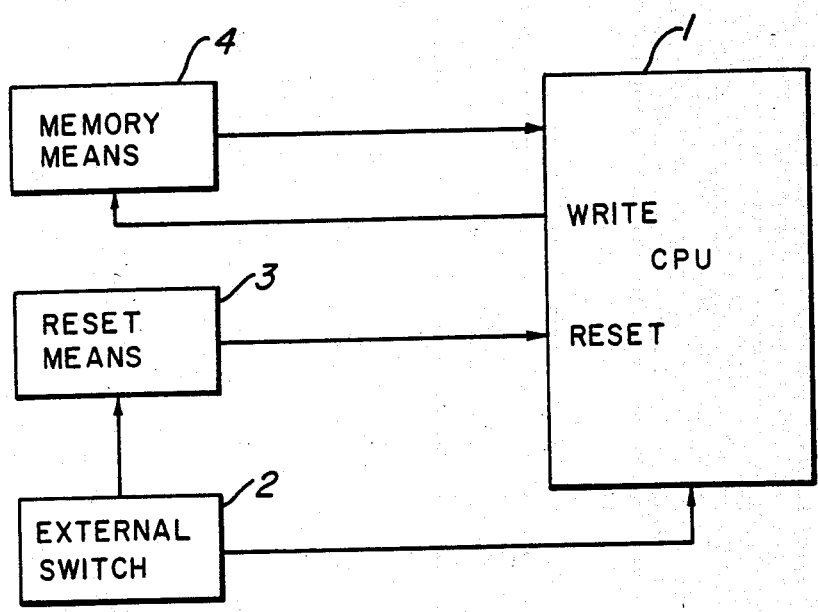
FIG. 1 is a block diagram showing the concept of a camera having a CPU reset function in accordance with the present invention.

A camera having a CPU reset function in accordance with the present invention, the concept of which is shown in FIG. 1, is a camera with a built-in CPU 1 to which electric power is always supplied from a power source. When an exposure operation possible state and an exposure operation impossible state is changed over by an external switch 2, a reset means 3 generates a reset signal in response to the changeover operation of the external switch 2 to reset the CPU 1. A memory means 4 is connected to the CPU 1. The states of camera operation, such as a state in which film is in the course of rewinding or a state in which film is in the course of advancing to the first effective frame, are written in the memory means 4. Thus, even if the external switch 2 is operated during these operations and the CPU 1 is reset to stop these operations, the contents of the memory means 4 are read out immediately after the disappearance of the reset signal so that the operation performed before the actuation of the external switch 2 can be continued.

Now, a first embodiment of the present invention will be described with reference to the drawings.

Figure 2:
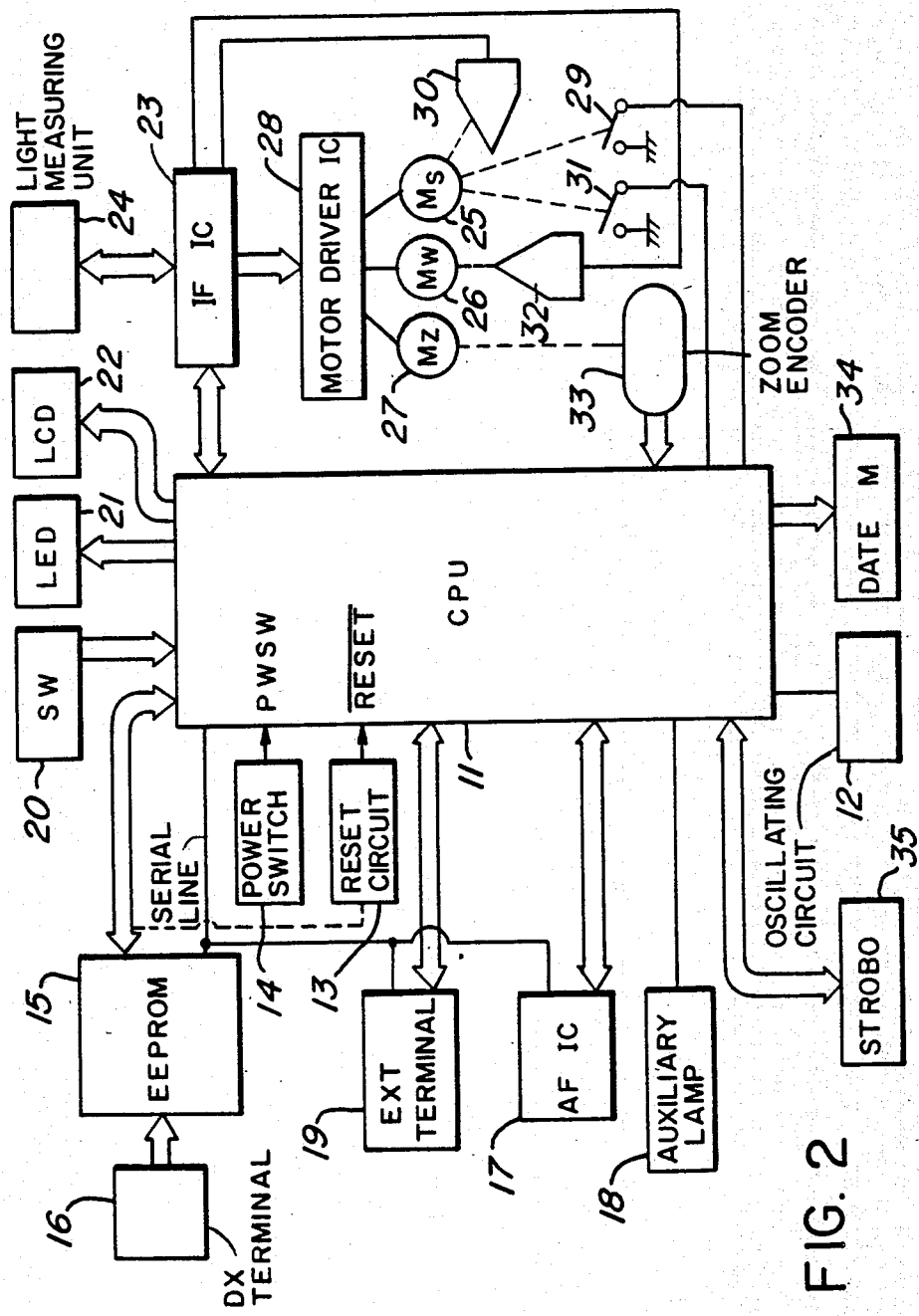
FIG. 2 is a block diagram showing a basic system of a first embodiment of a camera in accordance with the present invention.

FIG. 2 shows a basic system of the first embodiment of a camera in accordance with the present invention. A CPU 11 is formed by a one-chip microcomputer for controlling the entire camera. When a reference clock from an oscillating circuit 12 is inputted to the CPU 11 and a reset pulse from a reset circuit 13 is inputted to a $\overline{\text{RESET}}$ terminal to bring the CPU 11 to a reset state, then the CPU 11 starts to operate. That is, resetting the CPU 11 causes internal circuits of the CPU 11 to set its registers, input/output port, etc. to their initial states, and a program counter is also set to its initial address. The reset circuit 13 operates upon inserting a cell and in response to on-and-off signals outputted from a power switch 14 as an external switch to a PWSW terminal. Further, while the off signal is being inputted to the PWSW terminal, the CPU 11 stops the generation of the reference clock of the oscillating circuit 12 and turns into a standby mode.

An EEPROM (electrically erasable programmable read-only memory) 15 is a non-volatile memory for storing camera state data (film frame numbers; film is in the course of winding; etc.), abnormal data (fault points), and adjustment data (data for an individual camera, such as shutter control correction data, autofocus correction data, battery check data, etc.). Since camera state data are stored in the non-volatile memory, the camera can be restored to its previous state even if the cell is drawn out. As described below, while data are being written in the EEPROM 15, the reset operation of the reset circuit 13 is prohibited. When the EEPROM 15 is in a reading mode, a DX code is inputted from a DX terminal 16 to the EEPROM 15 and further to the CPU 11 through a serial line. Then the data of the EEPROM 15 are inputted to the CPU 11.

An autofocus sensor (AFIC) 17 is, for example, of the phase difference type, and its distance data are transferred to the CPU 11. If the measured light quantity is under a predetermined value, that is, an object to be photographed is too dark, the CPU 11 causes an auxiliary lamp 18 to light up in unison with the operation of the AFIC 17. An EXT terminal 19 is a connecting terminal for external apparatus such as an apparatus for automatically adjusting optional equipment. In order to utilize the port of the CPU 11 effectively, the EEPROM 15, the AFIC 17 and the EXT terminal 19 are connected to the same serial line so that data are transferred to and from the CPU 11 by serial transmission.

A switch circuit 20 for operating switches other than the power switch 14 is for a release switch, a mode changeover switch, etc. Light emitting diodes 21 within a finder include light emitting diodes for indicating expected electronic flash emission, focusing states, etc. A liquid crystal display plate 22 is to display film frame numbers, photographing modes of the camera, etc. An interface integrated circuit (IFIC) 23 has such functions as causing a light measuring unit 24 to measure light quantities or decoding instructions of the CPU 11 to select a motor in the camera.

A shutter driving motor 25, a film winding/rewinding motor 26 and a zooming motor 27 are driven by a motor driver IC 28 in response to the decoded signal of the the IFIC 23. The shutter driving motor 25 drives a lens during its normal rotation and drives a shutter during its reverse location. When the lens is driven, the reset position (initial position) of the lens is confirmed by the on (closed) state of a switch 29, and its controlled position is confirmed by the number of pulses of a photointerrupter 30. When the shutter is driven, its reset position is confirmed by the on state of a switch 31, and the shutter is controlled to maintain a predetermined shutter opening speed by varying the duty ratio of the shutter driving motor 25 on the basis of adjustment data of the EEPROM 15. The winding/rewinding motor 26 winds up the film during its normal rotation and rewinds the film during its reverse rotation. Advancing a frame of film is controlled by counting the number of pulses of a photointerrupter 32. The photointerrupters 30 and 32 are turned on only when the shutter driving motor 25 and the film winding/rewinding motor 26 are selected, respectively, and the outputs of the photointerrupters 30 and 32 are inputted to the CPU 11 through the IFIC 23. The zoom position of the zooming motor 27 can be detected by a zoom encoder 33. Further, a date module 34 for recording data such as dates and time, and an electronic flash 35 are also connected to the CPU 11.

Figure 3:
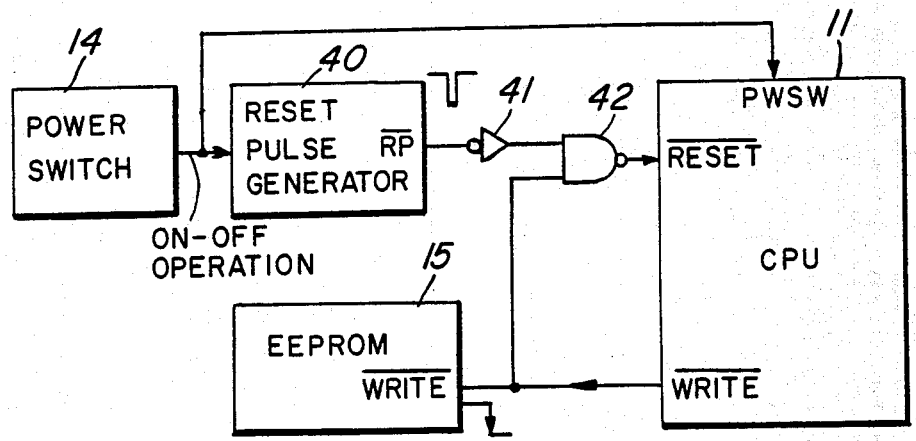
FIG. 3 is an electric circuit diagram showing a reset circuit of FIG. 2 schematically.

Referring to FIG. 3, the reset function of the CPU 11 of the camera shown in FIG. 2 is described. The reset circuit 13 includes a reset pulse generator 40 and a logical circuit comprising an inverter 41 and a NAND gate 42. When the user turns on or off the power switch 14, the reset pulse generator 40 generates a reset pulse of a low level "L" at its $\overline{\text{RP}}$ terminal in synchronism with the changeover operation of the power switch 14 from its on to off states or from its off to on states. This reset pulse is inverted by the inverter 41 to be applied to one of the inputs of the NAND gate 42.

When the CPU 11 does not send a writing instruction $\overline{\text{WRITE}}$ to the EEPROM 15, the $\overline{\text{WRITE}}$ terminal potential is at a high level "H". Since the high level voltage "H" is applied to the other input of the NAND gate 42, the above-mentioned reset pulse is inputted from the NAND gate 42 to the $\overline{\text{RESET}}$ terminal of the CPU 11 so that the CPU 11 turns into a reset state.

The CPU 11 sets information such as the film frame numbers, the states of camera operation, etc. into a RAM (random access memory) in the EEPROM 15 via the serial line (see FIG. 2). After the data are set in the RAM, the potential level of the $\overline{\text{WRITE}}$ terminal is changed from the high level "H" to the low level "L" and the data in the RAM of the EEPROM 15 are written in the ROM. When the $\overline{\text{WRITE}}$ terminal potential becomes low, the output of the NAND gate 42 to the $\overline{\text{RESET}}$ terminal of the CPU 11 becomes high irrespective of the output of the inverter 41, and the reset operation of the CPU 11 is prohibited.

Figure 5:
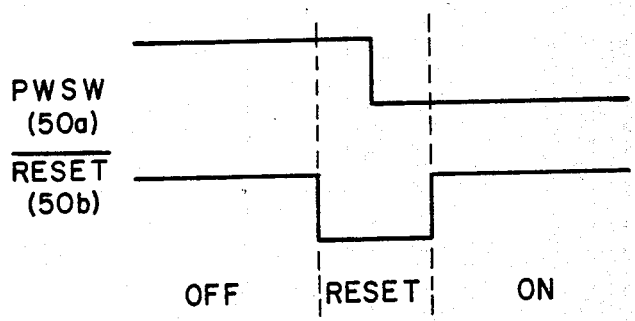
FIG. 5 is a signal wave form diagram illustrating the function of the operating switch shown in FIG. 4.
Figure 6:
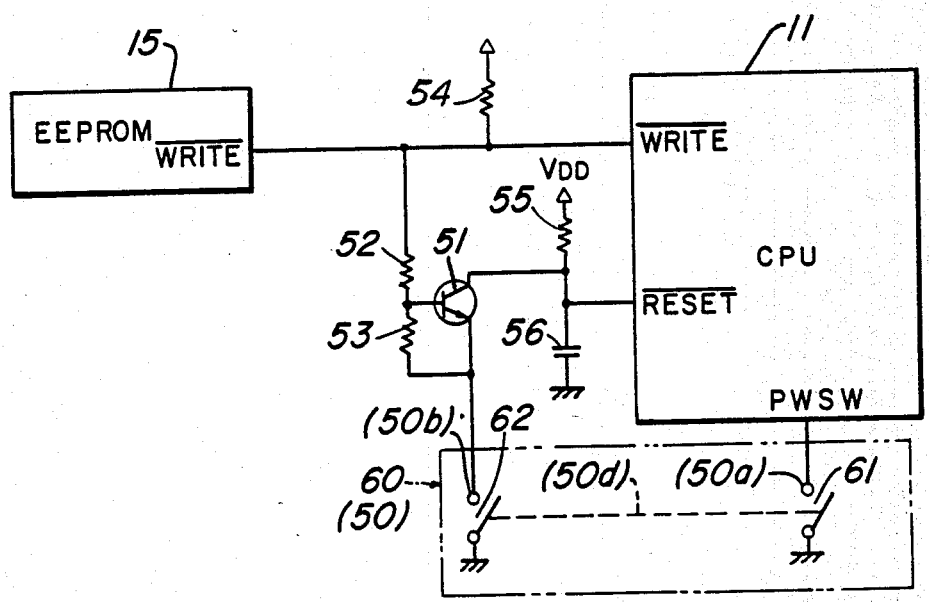
FIG. 6 is an electric circuit diagram of the second embodiment using the operating switch shown in FIG. 4.

Next, a second embodiment of the present invention will be described. The second embodiment utilizes the basic system shown in FIG. 2. An operating switch 50 shown in FIG. 4 has the functions of the power switch (external switch) 14 and the reset pulse generator 40, that is, the operating switch 50 is a power switch having a reset function. The operating switch 50 is provided with three fixed conductive patterns 50a, 50b and 50c. The conductive pattern 50a is an on-off determining pattern connected to a PWSW terminal of a CPU 11 as shown in FIG. 6, the conductive pattern 50b is a reset pattern connected to a $\overline{\text{RESET}}$ terminal of the CPU 11, and the conductive pattern 50c is a grounded pattern. A movable conductive contact piece 50d is arranged so as to slidably contact these fixed patterns. The conductive contact piece 50d is moved manually by the user. The operating switch 50 is brought to on, reset and off states in accordance with the position of the conductive contact piece 50c. When the conductive contact piece 50d is changed over from the on to off states or from the off to on states, the operating switch 50 is once brought to the reset state inevitably. This is shown as a time chart in FIG. 5. Thus the CPU 11 has only to check the state of the PWSW terminal (pattern 50a) of the operating switch 50 only after being reset.

As stated above, the user area of the EEPROM 15 is used to store the data on camera states, the film frame numbers, etc. If the operating switch 50 is directly connected to the CPU 11, and if the operating switch 50 is changed over during the writing of data in the EEPROM 15, the contents of the EEPROM 15 will be changed, resulting in a wrong decision. Therefore, in the camera of this embodiment, the conductive pattern 50b of the operating switch 50 is not directly connected to the $\overline{\text{RESET}}$ terminal of the CPU 11, and a circuitry having the same reset prohibiting function as that of the logical circuit comprising the inverter 41 and the NAND gate 42 in FIG. 3 is added to prevent the reset of the CPU 11 during the writing of data in the EEPROM 15.

Figure 4:
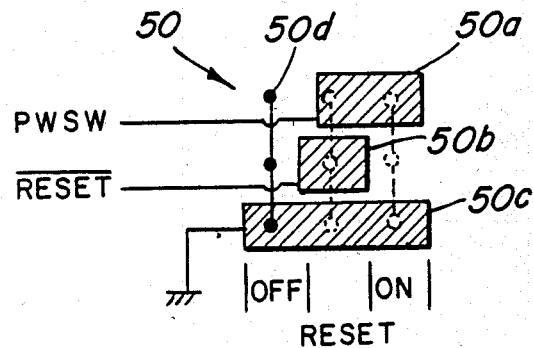
FIG. 4 is a pattern diagram showing the structure of an operating switch used in a second embodiment of the present invention.

FIG. 6 shows an electric circuit for the second embodiment using the operating switch 50 shown in FIG. 4. In FIG. 6, the operating switch 50 is symbolically shown as an operating switch 60. Grounded movable contact pieces of a power switch portion 61 and a reset switch portion 62 of the switch 60 correspond to the conductive contact piece 50c. A fixed contact of the power switch portion 61 corresponds to the conductive pattern 50a and is connected to the PWSW terminal of the CPU 11. A fixed contact of the reset switch portion 62 corresponds to the conductive pattern 50b and is connected to the emitter of an NPN transistor 51 and to a $\overline{\text{WRITE}}$ terminal of an EEPROM 15 through resistors 52 and 53. The $\overline{\text{WRITE}}$ terminal is connected to a pull-up resistor 54. The base of the transistor 51 is connected to a junction point of the resistors 52 and 53, and its collector is connected to a junction point of a resistor 55 and a capacitor 56 connected between a power source terminal $V_{DD}$ and a grounded terminal and then to the $\overline{\text{RESET}}$ terminal of the CPU 11.

Since the reset switch portion 62 is usually open, the transistor 51 is in its off state, and the capacitor 56 is charged from the power source terminal $V_{DD}$. When the power switch portion 61 of the operating switch 60 is changed over from its off to on states or from its on to off states, the reset switch portion 62 is closed in synchronism with the changeover of the power switch portion 61. At this time, if the $\overline{\text{WRITE}}$ terminal potential is high, the transistor 51 is turned on, the electric charge of the capacitor 56 is discharged through the transistor 51, and the change of potential at the junction of the capacitor 56 and the resistor 55 is inputted to the $\overline{\text{RESET}}$ terminal of the CPU 11.

On the other hand, while the CPU 11 are sending a writing instruction WRITE of a low level "L" to the EEPROM 15, the transistor 51 remains in its off state, and the capacitor 56 remains charged, even if the power switch portion 61 is turned on or off to close or open the reset switch portion 62. Thus no reset pulse is inputted to the $\overline{\text{RESET}}$ terminal. That is, the CPU 11 is prevented from being reset during the writing of data in the EEPROM 15. During that time, the CPU monitors the potential level of the PWSW terminal to check the changeover of the power switch portion 61. If the switch portion 61 was changed over, a power-on reset is effectuated to execute a program from the beginning when the writing of data in the EEPROM 15 has been completed and the WRITE terminal potential has become high.

The first and second embodiments of the present invention have an advantage that wrong information cannot be written in a memory means such as an EEPROM since the reset of the CPU is prohibited even if the external switch is operated during the writing.

Further, a third embodiment of the present invention will be described. This embodiment utilizes the basic system shown in FIG. 2.

Figure 7:
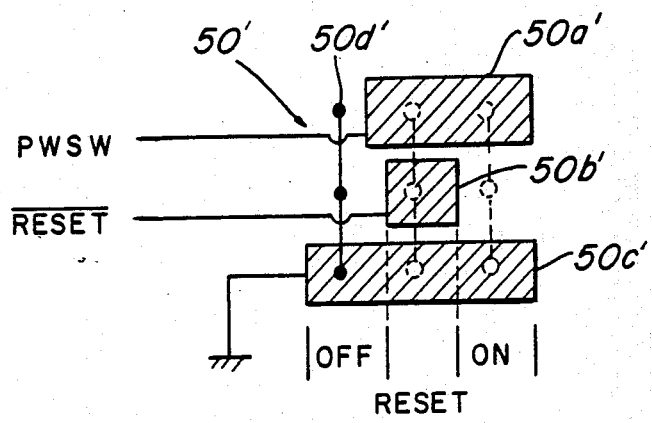
FIG. 7 is a pattern diagram showing the structure of an operating switch used in a third embodiment of the present invention.

FIG. 7 shows an operating switch 50' for supplying a reset trigger signal to the reset circuit 13 in FIG. 2. Elements having the same functions as those of the elements of the operating switch 50 shown in FIG. 4 are assigned the same reference characters with prime symbols.

In the operating switch 50' of FIG. 7, the left edge (off side) of an on-off determining pattern 50a' is on the left side of the left edge of a reset pattern 50b'. The area where the reset pattern 50b' is arranged is a reset area, the area on the left side of the reset pattern 50b' is an off area, and the area on the right side of the reset pattern 50b' is an on area. Thus, while the conductive pattern 50a in FIG. 4 is arranged in the on area and a part of the reset area, the conductive pattern 50a' in FIG. 7 covers a part of the off area in addition to the on and reset areas.

Figure 8:
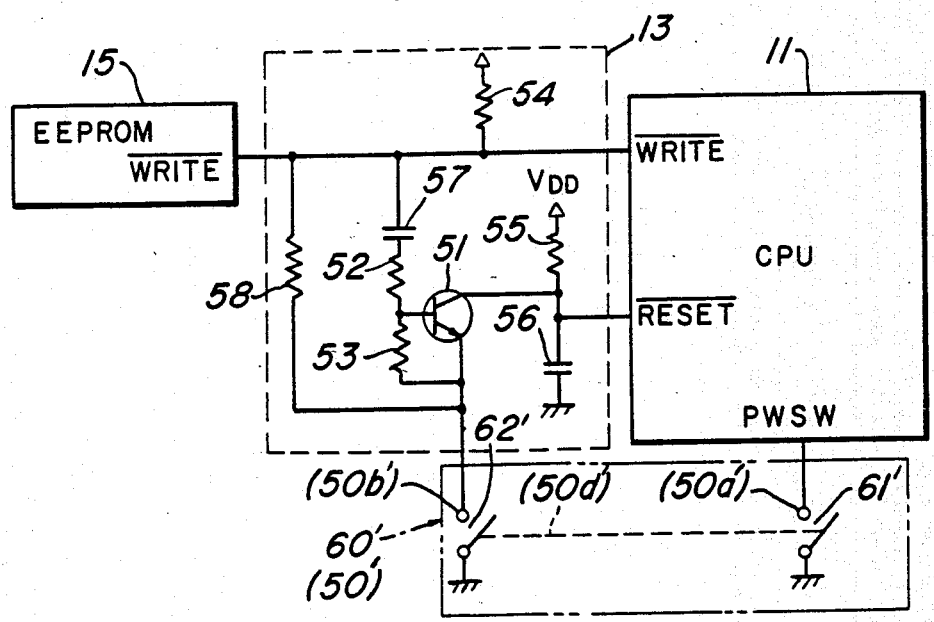
FIG. 8 is an electric circuit diagram of the third embodiment using the operating switch shown in FIG. 7.

As shown in FIG. 8, the pattern 50a' of the operating switch 50' is connected to a PWSW terminal of a CPU 11, and the pattern 50b' is connected to the emitter of a transistor 51. The circuit diagram of the operating switch 50' and a reset circuit 13 is the same as that of FIG. 6 except that a resistor 58 substantially larger than the resistor 54 is additionally connected between the emitter of the transistor 51 and the $\overline{\text{WRITE}}$ terminal of the EEPROM 15 and that a capacitor 57 is additionally connected between the resistors 52 and 54. Therefore the same elements as those of FIG. 6 are assigned the same reference characters.

The circuit of FIG. 8 has a function of generating a reset pulse for a predetermined time period, except for during the writing of data in the EEPROM 15, when a slidable contact piece 50d' of the operating switch 50' enters the reset area, and a function of detecting the slidable contact piece 50d' remaining in the reset area.

The operation of the circuit of FIG. 8 will be described with reference to FIGS. 9 to 11. FIG. 9 shows signal wave forms when the operating switch 50' is changed over from its off to on states. FIG. 10 shows signal wave forms when the operating switch 50' is changed over from its on to off states. FIG. 11 shows signal wave forms when the operating switch 50' is changed over from its off to on states as in FIG. 9 and the slidable contact piece 50d' stops in the reset area.

When the slidable contact piece 50d' is slided from the off to on areas, the conductive pattern 50a' is grounded first, that is, the powr switch portion 61' is turned on and the potential at the PWSW terminal of the CPU 11 becomes low as shown in FIG. 9(a). As shown in FIG. 9(b), the reset pattern 50b' is grounded after a predetermined time period, that is, the reset switch portion 62' is turned on.

At this time, if the potential at the $\overline{\text{WRITE}}$ terminal of the CPU 11 is high, the base current of the transistor 51 flows through the resistor 54, the capacitor 57, the resistor 52, the base and emitter of the transistor 51, and the switch 62' to turn on the transistor 51. This base current flows for a time period $T_1$ predetermined by the resistor 54, the capacitor 57, the resistor 52, and the resistance between the base and the emitter of the transistor 51, and the transistor 51 is conductive for that time period and the capacitor 56 is discharged. Therefore the potential at the junction point of the capacitor 56 and the resistor 55 drops, and the potential at the $\overline{\text{RESET}}$ terminal of the CPU 11 becomes low for that predetermined time period. That is, the reset period is the time period $T_1$.

On the other hand, if the potential at the $\overline{\text{WRITE}}$ terminal of the CPU 11 is low, that is, data are being written in the EEPROM 15, then the transistor 51 is not turned on so that no reset pulse is generated. As stated above, if the CPU 11 is reset by changing over the operating switch 50' during the writing of data in the EEPROM 15, the data in the EEPROM 15 will be changed, resulting in a wrong decision. The circuit of FIG. 8 prevents this.

As shown in FIG. 10, when the slidable contact piece 50d' is slided from the on to off areas, a reset pulse is also generated for the time period $T_1$ after the reset pattern 50b' is grounded.

Further, as shown in FIG. 11, when the conductive pattern 50d' stops sliding in the reset area, the CPU 11 lowers the $\overline{\text{WRITE}}$ terminal potential for a predetermined time period $T_3$ after a predetermined time period $T_2$ to create a dummy writing state. After the $\overline{\text{WRITE}}$ terminal potential becomes low, the electric charge stored in the capacitor 57 during the reset period $T_1$ is discharged through the resistor 58. Therefore, if the conductive pattern 50d' stays in the reset area over a time period of $T_1+T_2+T_3$, the transistor 51 is turned on again when the $\overline{\text{WRITE}}$ terminal potential becomes high, and a reset pulse is generated for the time period $T_1$. Thus the CPU 11 can be reset again.

Next, the operation of the third embodiment will be described, centering on the reset operation of the CPU.

Figure 12A:
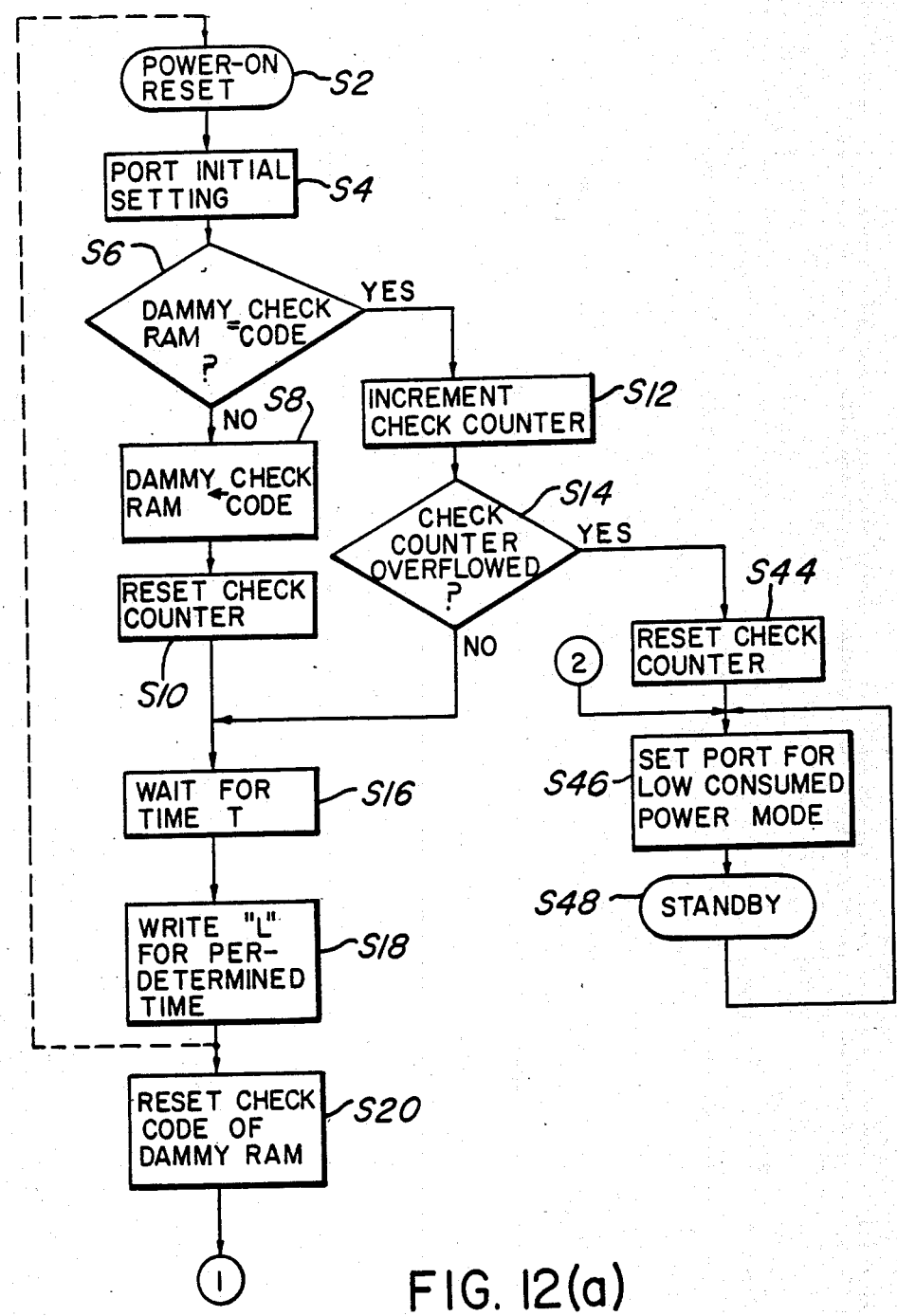
FIGS. 12(a) and (b) are flow charts showing the power-on reset operation of the third embodiment.

FIGS. 12(a) and (b) are flow charts of a routine "Power-On-Reset" which is started in response to the reset pulse generated by the reset circuit 13. That is, when the cell is inserted or the operation switch 50' is changed over, the camera executes this routine first.

At step 4, the initial setting of the input/output port and built-in RAM of the CPU 11 is executed.

At step 6, it is determined whether or not the data in a dummy RAM of the CPU 11 coincide with a check code. As described below, this is to decide whether this step has been executed a plurality of times (whether the operation switch stays in the reset area).

If the data in the dummy RAM do not coincide with the check code, the check code is set in the dummy RAM at step 8, and a check counter is reset at step 10.

After a wait of a predetermined time period t (for example, 0.1 sec.) at step 16, a low pulse (writing pulse) is generated from the $\overline{\text{WRITE}}$ terminal for the predetermined time period $T_3$ at step 18.

Figure 12B:
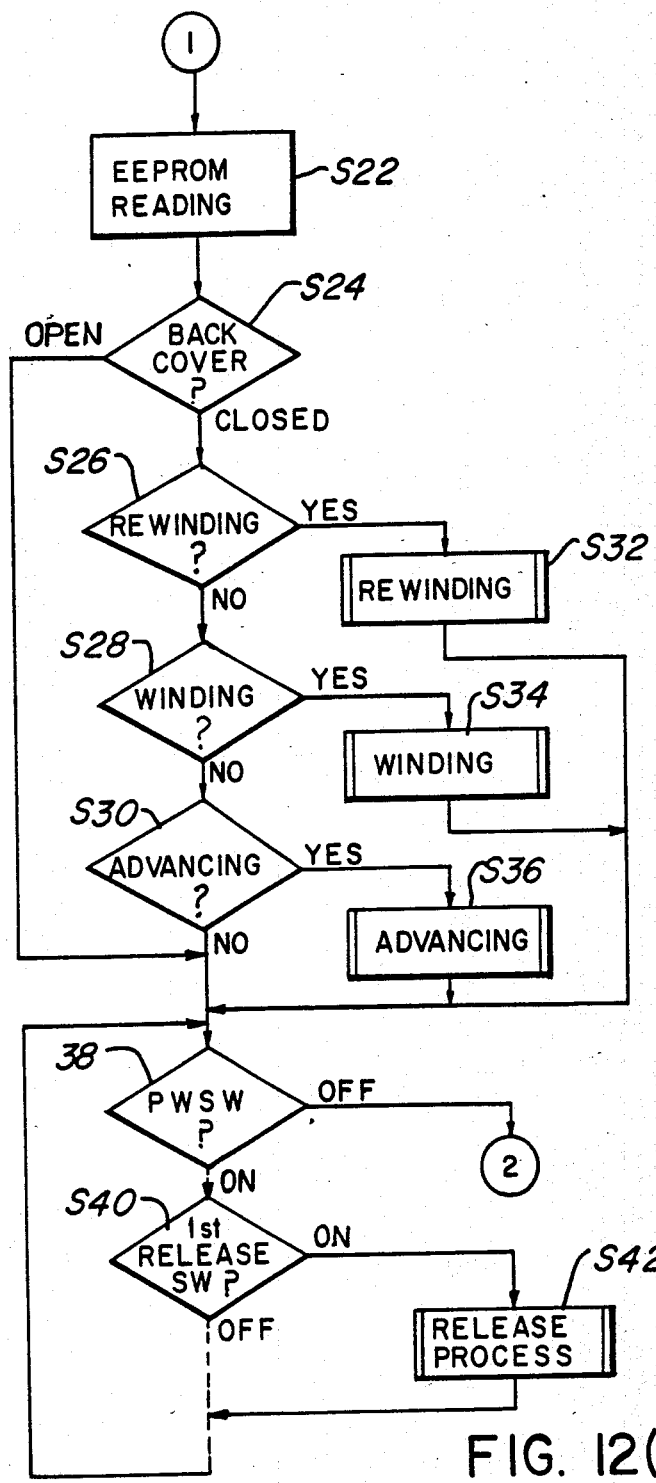

If the operating switch 50' does not stay in the reset area after the writing pulse is generated, the operation proceeds to step 20 where the check code in the dummy RAM is reset, and the normal sequence control of the camera shown in FIG. 12(b) is performed.

On the other hand, if the operating switch 50' is still in the reset area after the writing pulse is generated, a reset pulse is generated in synchronism with the arising of the $\overline{\text{WRITE}}$ terminal potential, as shown in FIG. 11. Thus the CPU 11 starts to operate again from the power-on reset (S2). At this time, since the check code was set in the dummy RAM at step 8, it is determined at step 6 that the data in the dummy RAM coincide with the check code. Therefore, step 12 is executed after step 6 to increment the check counter by one. At step 14, it is determined whether the check counter has overflowed. If it has not overflowed, the waiting operation of the time period t is repeated at step 16, and the $\overline{\text{WRITE}}$ terminal potential is lowered for the time period $T_3$.

That is, if the operating switch 50' passes through the reset area within a predetermined time period in which the check counter counts up to overflow, the program enters the normal sequence of the camera.

On the other hand, if the check counter is found to have overflowed at step 14, it is determined that the operating switch 50' has stayed over the predetermined time period; at step 44 the check counter is reset, and at step 46 the port is set so that the CPU 11 is brought to the low consumed power mode, and the oscillation is stopped. Then, at step 48, the standby mode is established.

In this way, even if the reference clock is being supplied to the CPU at the time of resetting, the low consumed power mode can be established. If the operating switch is moved during the standby mode, the CPU is reset again.

FIG. 12(b) shows a normal operation sequence of the camera. First, a subroutine "EEPROM Reading" is executed at step 22 where the camera state data, adjustment data, etc. of the EEPROM 15 are written in the RAM of the CPU 11. It is not until then that the camera is ready to operate. Otherwise, the user may reset the CPU 11 during film rewinding, film advancing to the first effective frame, etc., since the operating switch 50' is coupled to the reset circuit 13. Further, it is because it is necessary to know the previous camera states when the cell is exhausted or drawn out and then power is turned on again.

On the basis of the data read out from the EEPROM 15, the states of the camera operation are checked. At step 24, on the basis of the output of a back cover switch actuated in response to the opening and closing of the back cover, it is determined whether the back cover is closed or not. If it is closed, it is determined at step 26 whether the film is in the course of rewinding. If it is in the course of rewinding, a subroutine "Film Rewinding" is executed.

Figure 14:
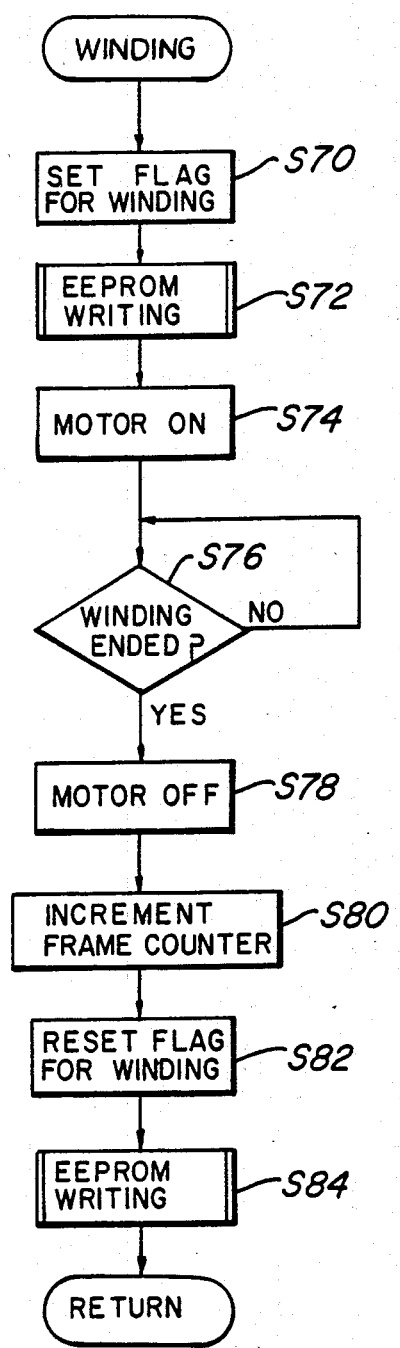
FIG. 14 is a flow chart of a subroutine "Film Winding"

If the film is not in the course of rewinding, it is determined at step 28 whether the film is in the course of winding or not. If it is in the course of winding, a subroutine "Film Winding" is executed at step 34 (FIG. 14).

If the film is not in the course of winding, it is determined at step 30 whether the film is in the course of advancing to the first effective frame. If it is, a subroutine "Film Advancing to the First Effective Frame" is executed at step 36.

If the back cover of the camera is open, of if the subroutine "Film Rewinding", "Film Winding" or "Film Advancing to the First Effective Frame" is finished, or if the film is not in the course of advancing to the first effective frame, then at step 38 the on or off state of the power switch portion 61' is determined on the basis of the potential level of the PWSW terminal. If the power switch portion 61' is off, the low consumed power mode is set at step 46 so that the CPU 11 is brought to the standby state and waits for the operating switch 50' to be turned on again to reset the CPU 11.

That is, for example, if the power switch portion 61' is turned off during film rewinding and then turned on to reset the CPU 11 again, film winding is continued, and the camera operation is stopped after film winding is finished. It does not matter that as shown in FIG. 9 the reset pulse is generated after the power switch portion 61' is changed over from its off to on states. If the power switch portion 61' is on when the reset pulse has been produced, the camera operates normally.

Further, when the power switch portion 61' is changed over from its on to off states as shown in FIG. 10, it does not matter that the CPU 11 is reset immediately before the power switch portion 61' is turned off, since the state of the power switch portion 61' is always determined at step 38 and the operation of the CPU 11 is stopped in the main loop when the power switch portion 61' has been turned off.

If the power switch portion 61' is found to be on at step 38, the state of a first release switch is determined at step 40, the first release switch being turned on when the release button is pushed down halfway. If the first release switch is on, a subroutine "Release Process" (FIG. 13) is executed in step 42.

If the first release switch is off, or if the subroutine "Release Process" is finished, step 38 for determining the state of the first release switch is repeated.

Figure 13:
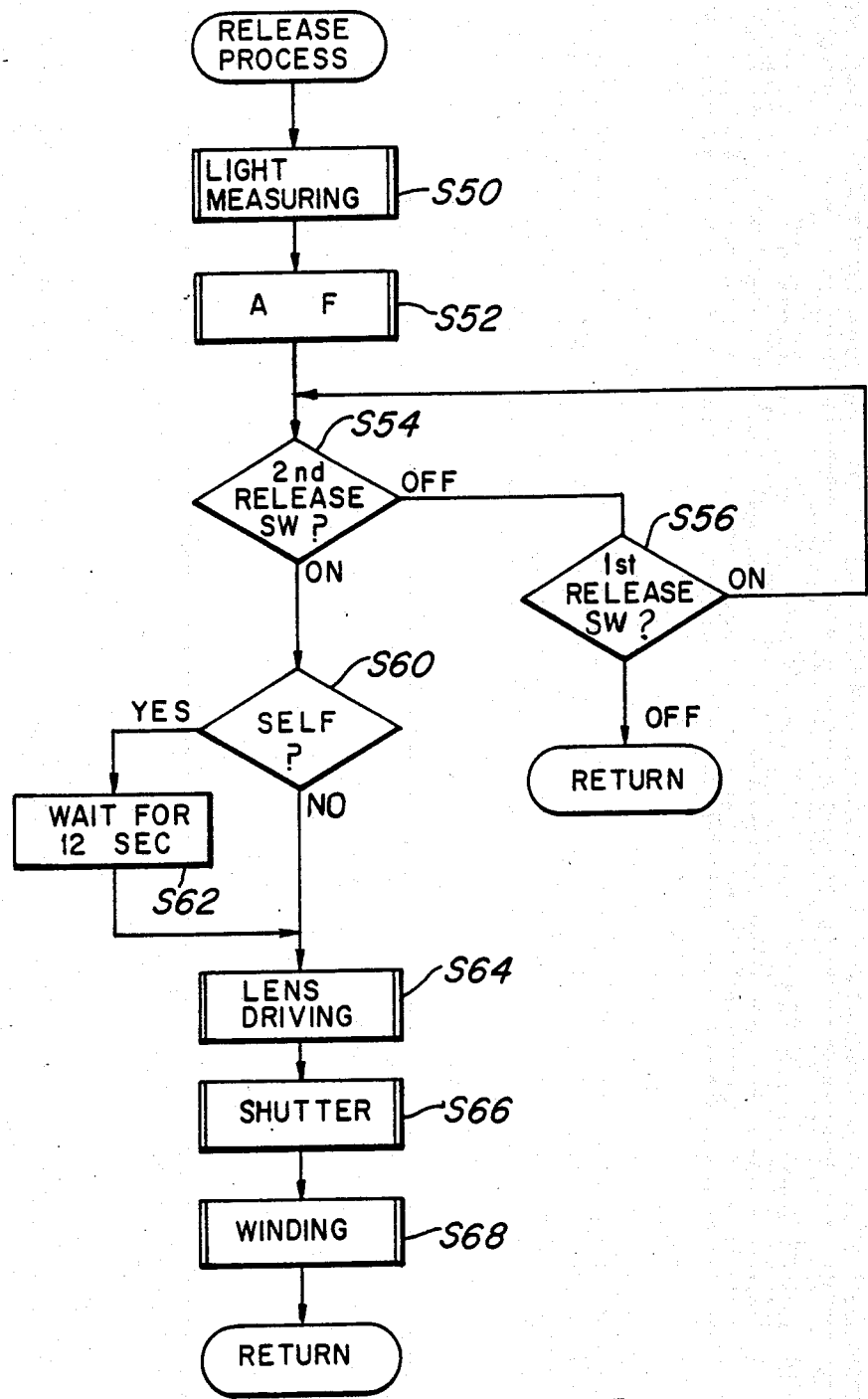
FIG. 13 is a flow chart of a subroutine "Release Process"

FIG. 13 is a flow chart of the subroutine "Release Process" (S42 in FIG. 12(b)).

At step 50, a subroutine "Light Measuring" is executed to compute the exposure value.

At step 52, a subroutine "AF" is execute where the distance is measured by the AFIC 17.

The state of a second release switch is determined at step 54, the second release switch being turned on when the release button has been pushed down completely. If the second release switch is off, it is determined at step 56 whether the first release switch is on. If the first release switch is on, the operation returns to step 54. This is an AF lock state. If the first release switch is off, the operation returns to the main routine.

If the second release switch is on, photographing operation is started. First, it is determined at step 60 whether a self mode is established. If the self mode is not established, step 64 is executed immediately. If the self mode is established, step 64 is executed after a wait of 12 seconds at step 62.

Subroutines "Lens Driving" and "Shutter" are executed at steps 64 and 66, respectively. After the subroutine "Film Winding" is executed at step 68, the operation returns to the main routine.

FIG. 14 is a flow chart of the subroutine "Film Winding" (S34 in FIG. 12(b); S68 in FIG. 13).

At step 70, a flag for winding is set. At step 72, a subroutine "EEPROM Writing" (FIG. 15) is executed to write in the EEPROM 15 the flag for winding and the data on the film frame numbers and the camera sates. This is to recover the previous state even if power is turned off during film winding.

At step 74, the film winding/rewinding motor 26 is rotated to wind up the film. At step 76, on the basis of the output of the photointerrupter 32, it is determined whether the film has been wound up by one frame.

If the film has been wound up by one frame, the rotation of the film winding/rewinding motor 26 is stopped at step 78. At step 80, the film frame counter is incremented. At step 82, the flag for winding is reset.

At step 84, the subroutine "EEPROM Writing" (FIG. 15) is executed to write in the EEPROM 15 the reset flag for winding and the data on the film frame numbers and the camera states. Then the operation returns to the main routine.

Thus, since the camera states are written in the EEPROM 15 before film winding is started and after film winding is finished, even if the operating switch 50' is turned off during film winding, film winding can be properly continued after the power-on reset of the CPU 11.

The subroutine "Film Advancing to the First Effective Frame" is for winding up the film automatically by a few frames after the film is loaded and the rear cover is closed, and executes the subroutine "Film Winding" successively a few times. Just like the subroutine "Film Winding", the subroutine "Film Rewinding" is for rotating the film winding/rewinding motor 26 inversely until the film stops.

Figure 15:
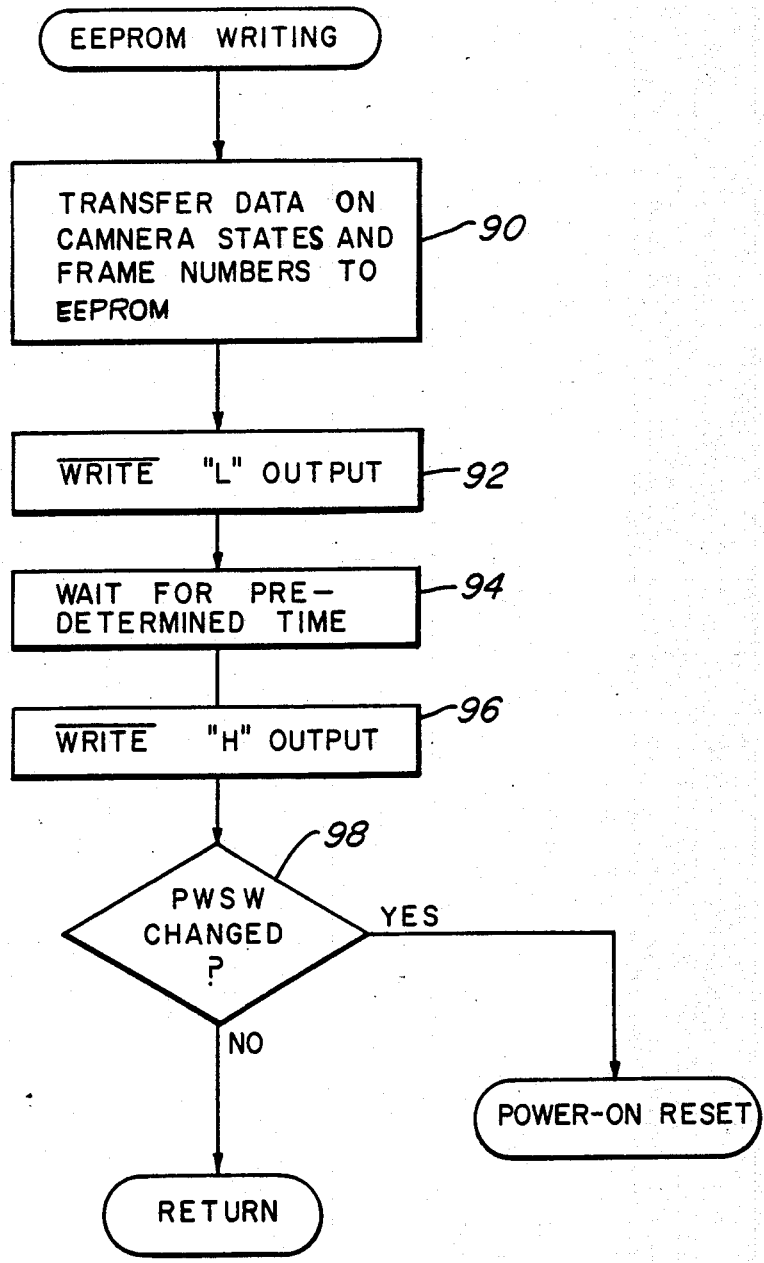
FIG. 15 is a flow chart of a subroutine "EEPROM Writing"

FIG. 15 is a flow chart of the surbroutine "EEPROM Writing" (S72 and S84 in FIG. 14).

At step 90, the data on the camera states and the film frame numbers are transferred to the EEPROM 15. The $\overline{\text{WRITE}}$ terminal potential is lowered at step 92. The data are written during a wait of a predetermined time period at step 94.

After the $\overline{\text{WRITE}}$ terminal potential is restored to the high level at step 96, it is determined at step 98 whether the state of the power switch portion 61' has been changed. Since the resetting of the CPU 11 is prohibited during the writing operation, it must be determined whether the operating switch 60' has been moved to the reset area. If the state of the operating switch 60' has been changed, the power-on reset is executed again; otherwise, the operation is returned to the main routine.

The above-described third embodiment has the following effects:

Assume that the reset check at step 14 in FIG. 12(a) is omitted. If, for example, the power switch portion 61' is turned off during film winding, but stopped in the reset area, the following inconvenience is caused. Since the CPU 11 has been reset during film winding, film winding is executed again, upon the power-on reset, on the basis of the camera state data in the EEPROM 15. However, since there is "EEPROM Writing" (S72 in FIG. 14) at the beginning of the subroutine "Film Winding", the CPU 11 is reset again when the $\overline{\text{WRITE}}$ terminal potential has become high at the end of EEPROM writing, as explained with reference to FIG. 11. Thus the CPU 11 is reset again and again before the motor is driven; an endless loop is formed.

According to this embodiment, however, if the operating switch stays in the reset area over a predetermined time period, the CPU can be automatically reset again and brought into the low consumed power mode (standby mode).

If the operating switch had no conductive reset pattern, and a circuit for detecting the building up and falling of the power switch signal to generate a reset pulse were used, there would be no such problem. Instead, however, if the operating switch is stopped near the switch changeover position, the CPU is in a state in which it may be reset at any time.

Therefore it is preferred, as in this embodiment, to provide the reset pattern in the reset area and prohibit the camera operation when the operating switch is in the reset area. When the camera operation is stopped, the user can resume the operation by actuating the operating switch again so that there is no problem.

Further, the operating switch must be usually designed to have a mechanism, such as a click, for preventing the operating switch from stopping in the reset area. As described above, however, there is no problem even if it is stopped; thus the switch can be designed much easier.

Finally, a fourth embodiment of the invention will be described. While the third embodiment uses a manually operable slide switch as a power switch, the fourth embodiment employs a switch provided in front of a photographing lens to respond to the movement of a barrier which changes over between the photographing enabling and prohibiting states.

FIGS. 16(a) to (d) show the states of the switch corresponding to four positions of the barrier from its closed to open positions.

A projection 86 is provided on the inner side of the barrier 84 and moved from left to right in the figure in a groove provided in the surface of a camera while the barrier is moved from its closed to open positions. A camera body is provided with an operating switch 80 and an insulating rotor 82. The switch 80 includes a reset contact piece 80a, a grounded contact piece 80b and a power switch contact piece 80c. The insulating rotor 82 is integrally provided with a projection 82' projecting towards the camera body and is rotated by the projection 86 to cause the contact pieces 80a, 80b and 80c to contact with each other. Further, locking projections 88a and 88b is fixed to the camera body for locking the contact pieces 80a, 80b and 80c in their biased states.

Figure 16A:
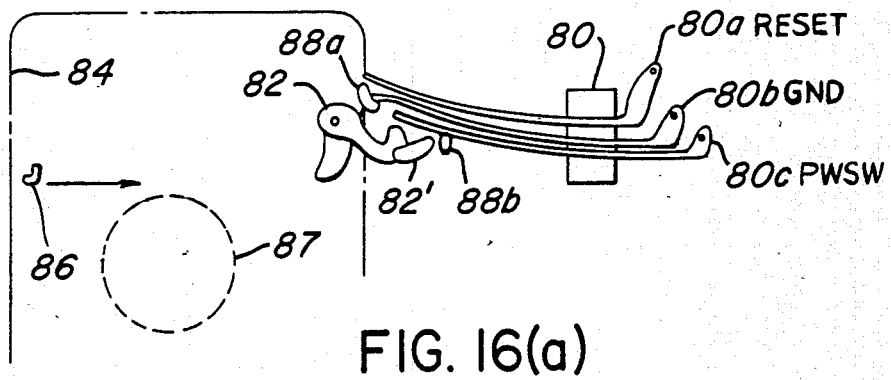
FIGS. 16(a) to (d) are schematic diagrams showing the operation of an operating switch of a fourth embodiment.

As shown in FIG. 16(a), when the barrier 84 is closed, the photographing lens 87 is covered by the barrier 84, and the contact pieces 80a, 80b and 80c do not contact with each other so that the operating switch 80 is off.

Figure 16B:
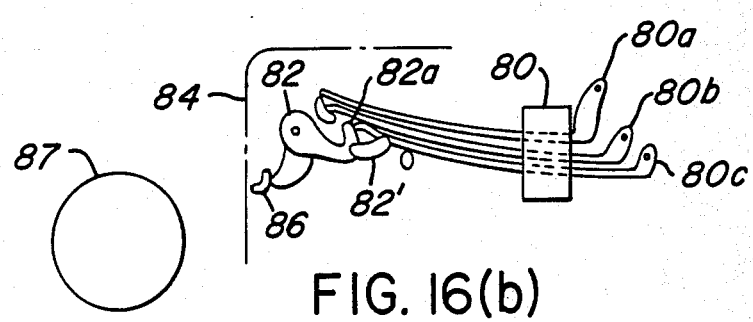
Figure 16C:
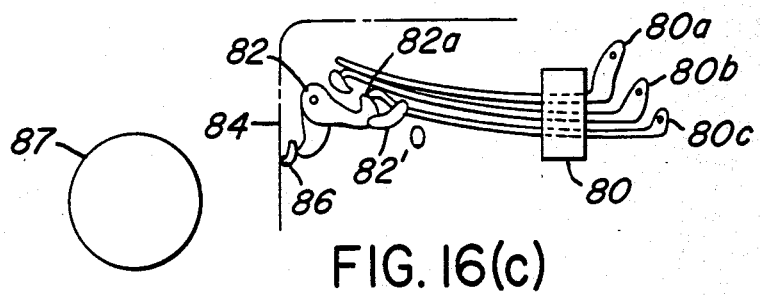

When the barrier 84 is opened, the photographing lens 87 is exposed. When the projection 86 abuts against the rotor 82, a tip portion 82a of the rotor 82 pushes up the power switch contact piece 80c so that the power switch contact piece 80c contacts the grounded contact piece 80b as shown in FIG. 16(b). Then the grounded contact piece 80b contacts the reset contact piece 80a as shown in FIG. 16(c), and the power switch is brought to its reset state. Since the projection 82' is provided at a position where it does not contact the contact pieces 80b and 80c, the projection 82' does not push the contact pieces 80b and 80c as shown in FIGS. 16(b) and (c).

Figure 16D:
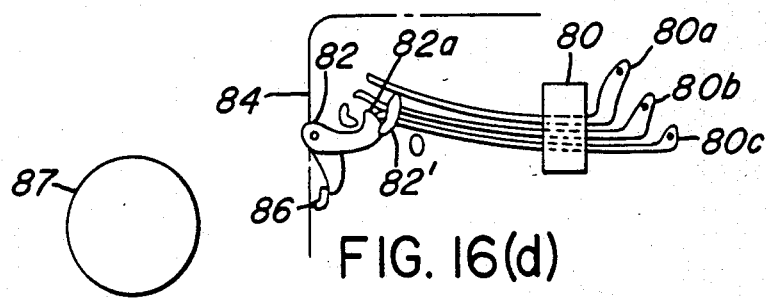

The reset contact piece 80a has a portion 80a' projecting towards the camera surface as shown in the cross-sectional view of FIG. 17. Thus, as shown in FIG. 16(d), when the barrier 84 is fully open, the reset contact piece 80a is separated from the grounded contact piece 80b with the power switch contact piece 80c remaining in contact with the grounded contact piece 80b, and the operating switch is brought to its on state. At this time, the tip portion 82a of the rotor 82 pushes up the power switch contact piece 80c and makes it contact the grounded contact piece 80b, and the projection 82' separates the reset contact piece 80a from the grounded contact piece 80b.

FIG. 18 is a signal wave form diagram showing the operation of the barrier switch. Reference characters a, b, c and d represents the time periods in which the barrier 84 is located in the positions shown in FIGS. 16(a) to (d), respectively. In the time period b, although the power switch is on, the CPU is in the standby state so that the camera retains the switch-off state.

What is claimed is:

1. A camera having a photographing operation possible state and a photographing operation impossible state, the camera comprising:
   a CPU to which power is to be always supplied;
   an external switch for changing over between the photographing operation possible state and the photographing operation impossible state;
   reset means responsive to the changeover of the external switch for generating a reset signal to reset the CPU; and
   memory means for storing data on the state of operation, such as film winding and rewinding, performed by the camera before the operation of the external switch;
   after being reset, the CPU executing a prescribed camera operation in accordance with the data stored in the memory means.

2. The camera of claim 1 further comprising prohibiting means for prohibiting the reset signal from being inputted to the CPU while a writing instruction is outputted from the CPU to the memory means.

3. The camera of claim 2 wherein the prohibiting means comprises a logical circuit for performing the logical add operation of the writing instruction signal and the reset signal.

4. The camera of claim 2 wherein the prohibiting means comprises switching means for prohibiting the reset signal from being inputted to the CPU while the writing instruction signal is outputted.

5. The camera of claim 1 wherein the external switch has a reset area through which the external switch moves when the external switch is changed over between the photographing operation possible state and the photographing operation impossible state, and the external switch generates the reset signal when the external switch is in the reset area.

6. The camera of claim 1 further comprising means for generating a reference clock to be supplied to the CPU, wherein the CPU stops the generation of the reference clock when the external switch is in the photographing operation impossible state.

7. The camera of claim 1 wherein the memory means is an electrically erasable, non-volatile memory.

8. The camera of claim 7 further comprising a back cover, wherein after being reset the CPU reads the data on the state of camera operation stored in the non-volatile memory and does not execute other camera operation, such as film rewinding, if the back cover is open.

9. The camera of claim 1 further comprising a photographing lens and a barrier movable between a first position where the barrier covers the photographing lens and a second position where the barrier uncovers the photographing lens, wherein the external switch is opened and closed interlocking with the barrier.

10. The camera of claim 1 wherein the external switch has a reset area, the camera further comprising:
   detecting means for detecting, and outputting a signal representing, the external switch remaining in the reset area;
   means for generating a reference clock to be supplied to the CPU; and
   means for causing the CPU to stop the generation of the reference clock in accordance with the signal from the detecting means.

11. The camera of claim 10 wherein the detecting operation of the detecting means is performed when the CPU has started to operate upon being reset.

12. A camera comprising:
   an external switch operated between an on state in which photographing operation is possible and an off state in which photographing operation is impossible;
   reset signal generating means responsive to the operation of the external switch for generating a reset signal of a predetermined width, the reset signal being generated when the external switch is in the on state; and
   a microcomputer to which power is to be always supplied and which starts oscillation upon receipt of the reset pulse and determines the state of the external switch, the microcomputer maintaining the oscillating state if the external switch is in the on state and stopping the oscillation if the external switch is in the off state.

13. A camera comprising:
   a microcomputer;
   an on-off switch for generating an on signal for maintaining the microcomputer in a oscillating state and an off signal for stopping the oscillation of the microcomputer;
   a reset switch for generating a reset signal to reset the microcomputer;
   an operating member for changing over the on-off switch and actuating the reset switch during the changeover operation of the on-off switch to generate the reset signal;
   detecting means for detecting, and generating an output signal representing, that the operating member remains over a predetermined time period in the state for actuating the reset switch; and
   means for stopping the oscillation of the microcomputer in response to the output signal from the detecting means.

14. A method of resetting a CPU for controlling photographing operation of a camera having an external switch operated between an on state in which photographing operation is possible and an off state in which photographing operation is impossible, and reset signal generating means responsive to the operation of the external switch for generating a reset signal of a predetermined width, the method comprising the steps of:
   stopping a reference clock inputted to the CPU if the external switch is in the off state; and
   resetting the CPU in response to the reset signal outputted when the external switch is changed over from the off state to the on state.

15. The method of claim 14 further comprising the step of prohibiting the reset signal from being inputted to the CPU while a writing signal is generated by the CPU to write data on camera operation in memory means.

16. The method of claim 14 further comprising the steps of:
   determining whether the external switch remains in a reset area for generating the reset signal, over a predetermined time period after the CPU is reset in response to the reset signal; and
   if so, stopping the generation of a reference clock for the CPU.

* * * * *